US008028660B2

(12) United States Patent
Troy

(10) Patent No.: US 8,028,660 B2
(45) Date of Patent: Oct. 4, 2011

(54) AUTOMATED POSITIONING AND SUBMERSIBLE OPEN OCEAN PLATFORM

(75) Inventor: Paul James Troy, Capt. Cook, HI (US)

(73) Assignee: Hawaii Oceanic Technology, Inc., Honolulu, HI (US)

( * ) Notice: Subject to any disclaimer, the term of this patent is extended or adjusted under 35 U.S.C. 154(b) by 365 days.

(21) Appl. No.: 11/849,338

(22) Filed: Sep. 3, 2007

(65) Prior Publication Data
US 2009/0235870 A1 Sep. 24, 2009

Related U.S. Application Data

(60) Provisional application No. 60/850,855, filed on Oct. 10, 2006.

(51) Int. Cl.
*A01K 61/00* (2006.01)
*A01K 63/00* (2006.01)
(52) U.S. Cl. ........................................ 119/223; 119/215
(58) Field of Classification Search .................. 119/207, 119/223, 208, 211; 114/264, 266, 330, 338, 114/337
See application file for complete search history.

(56) References Cited

U.S. PATENT DOCUMENTS

| | | | |
|---|---|---|---|
| 2,006,985 A | 7/1935 | Claude et al. | |
| 3,805,515 A | 4/1974 | Zener | |
| 3,860,900 A * | 1/1975 | Scudder | 367/6 |
| 3,883,913 A * | 5/1975 | Givens | 441/37 |
| 4,224,891 A * | 9/1980 | Rinaldi | 114/256 |
| 4,302,297 A | 11/1981 | Humiston | |
| 4,312,296 A * | 1/1982 | Stelleman et al. | 119/223 |
| 4,334,873 A * | 6/1982 | Connell | 440/113 |
| 4,355,513 A * | 10/1982 | Girden | 60/641.7 |
| 4,441,321 A | 4/1984 | Ridgway | |
| 4,726,191 A | 2/1988 | Kawamura | |
| 4,936,253 A * | 6/1990 | Otamendi-Busto | 119/223 |
| 5,617,813 A * | 4/1997 | Loverich et al. | 119/223 |
| 6,044,798 A | 4/2000 | Foster et al. | |
| 6,202,417 B1 | 3/2001 | Beck | |
| 6,520,115 B2 | 2/2003 | Boyd | |
| 6,550,248 B1 | 4/2003 | Sangster et al. | |
| 6,568,169 B2 * | 5/2003 | Conde et al. | 60/39.6 |
| 7,178,337 B2 | 2/2007 | Pflanz | |
| 7,743,733 B2 * | 6/2010 | Harrison et al. | 119/210 |

FOREIGN PATENT DOCUMENTS

JP 2003081188 A * 3/2003
JP 2005143403 A * 6/2005

* cited by examiner

*Primary Examiner* — Kimberly S Smith
*Assistant Examiner* — Joshua Huson
(74) *Attorney, Agent, or Firm* — Seth M. Reiss, AAL, ALLLC

(57) ABSTRACT

An open-ocean fish-growing platform has a submersible cage structure for growing fish, an antenna for receiving positioning signals transmitted from an external source, a position-correction apparatus for calculating a position error signal from a target geostationary position, and an ocean thermal energy conversion (OTEC) system for generating electric power for thruster units to maintain the cage structure in the target geostationary position. The OTEC system inducts colder ocean water from a deeper ocean depth for driving its heat exchange cycle, and is also of hybrid type using a fuel-fired unit as a heat source. The cold water effluent from the OTEC system is directed into the cage for flushing wastes generated by the growing fish. The self-positioning, self-powered open-ocean platform enables unmanned, extended marine deployment in deeper ocean waters without the need for tethering or anchoring to the ocean floor.

21 Claims, 20 Drawing Sheets

Submerging        Surfacing

Position Two ($\vec{P_2}$)

$t_2$

Position One ($\vec{P_1}$)

$t_1$

Current ($\vec{V_c}$)

$\vec{\Delta P} = \vec{P_2} - \vec{P_1}$ $\Delta t = t_2 - t_1$ $\vec{V_c} = \dfrac{\vec{\Delta P}}{\Delta t}$

AUTOMATED POSITIONING AND SUBMERSIBLE OPEN OCEAN PLATFORM

This U.S. Patent Application claims the priority of U.S. Provisional Patent Application 60/850,855 filed on Oct. 10, 2006, by the same inventor and of the same title.

TECHNICAL FIELD

The invention relates to the field of open ocean structures, and particularly to an automated positioning and submersible open ocean platform suitable for growing and harvesting fish.

BACKGROUND OF INVENTION

Prior attempts have been made to develop aquaculture systems for growing and harvesting fish by mooring or tethering cage structures to shore piers or anchoring them to the sea floor. For example, U.S. Pat. No. 6,044,798 to Foster et al., issued April 2000, disclosed a floating aquaculture apparatus which is moored by anchors and is submerged in a natural body of water, and U.S. Pat. No. 6,520,115 to Boyd, issued February 2003, disclosed an "Artificial Island Reef Platform" for raising large quantities of pelagic fish with design features that include a large subsurface framework, cabling network, multiple cages and stable anchoring system. Other floating and/or submerged sea cages for aquaculture use are proposed in U.S. Pat. No. 6,044,798 to Foster et al.

An example of a currently used type of near-shore-deployed sea cage is the SEA STATION™ cages made by Ocean Spar, LLC, of Bainbridge Island, Wash. This type of cage typically has a central stem with an air chamber for controlling buoyancy for surfacing or submerging. The bottom of the central stem is tethered to an anchor (or anchors) or grid mooring system on the sea floor. The outer periphery of the cage has mesh netting forming the outer boundaries for the cage. Even when deployed in ocean waters, wastes from the growing fish can become concentrated in the cage volume and the mesh netting may become contaminated and not able to be cleaned efficiently at sea. Prior techniques to clean the top half of ocean fish-growing cages include the technique of releasing the central stem from its anchor tether partially and pumping air into the air chamber in the central stem for buoyancy to propel it upwards toward the ocean surface so that the upper portions of the netting can be exposed for air-drying. While air-drying of the netting does appear to kill parasites that adhere to the netting, cleaning the lower portions of the netting for the cage requires extensive use of divers and specialized high-pressure-washing equipment, which is very costly and time-consuming.

Ocean thermal energy conversion (OTEC) has been used to generate electric power for various ocean and shore industrial uses. An early example of an oceanic heat pump is provided in U.S. Pat. No. 2,006,985 to Claude et al., issued in July 1935. U.S. Pat. No. 4,726,191 to Kawamura, issued in February 1988, disclosed a land-based plant using heat exchange with cold deep well water inducted through ground pipes to generate electricity, and also mentioned that the cold water effluent may also be used for an aquaculture preserve. OTEC systems use a heat pump cycle commonly referred to as the "Stirling" cycle, after the Stirling-cycle engine invented by Robert Stirling in 1817. Various other proposals have been developed for using OTEC-generated power, such as for desalinization plants as described in U.S. Pat. No. 4,302,297 to Humiston, and electricity generation in U.S. Pat. No. 4,441,321 to Ridgway and U.S. Pat. No. 6,202,417 to Beck.

SUMMARY OF INVENTION

In the present invention, an open-ocean platform to be maintained in an approximate geostationary position in the ocean comprises:

(a) a submersible cage structure for use in the open ocean submerged below the ocean surface for growing an ocean resource within a cage volume contained therein;

(b) a signal-receiving apparatus coupled to the cage structure for receiving an ocean-positioning signal transmitted from an external source;

(c) a geostationary-position-correction apparatus for providing a geostationary-error signal for the cage structure in the ocean based on the ocean-positioning signal received by the signal-receiving apparatus; and (d) a propulsion system coupled to the cage structure for generating and directing a corrective propulsion force commensurate with the geostationary-error signal provided from the geostationary-position-correction apparatus so as to maintain the cage structure in approximate correspondence with a target geostationary position.

The automated positioning and submersible open-ocean platform enables extended marine deployment in the ocean such as for ocean fish growing and harvesting operations in a leased open-ocean aquaculture zone. A plurality of submersible self-positioning platforms can be operated and maintained in a fleet pattern in a leased zone. The automated self-positioning function eliminates the need to anchor the platforms to the ocean floor or to moor them to anchored buoys, thereby allowing large-scale fish growing operations in greater ocean depths, such as in the exclusive economic zone of a country or sovereign jurisdiction from 3 to 12 miles offshore under international protocols.

In a preferred embodiment, the ocean-positioning signals may be obtained from Global Positioning System (GPS) signals that are broadcast continuously by a network of geosynchronous satellites through the antenna receiver of the ocean-going platform. The platform can have an antenna attached to its cage structure for receiving GPS signals while the cage structure is surfaced, or can have the antenna mounted to a floating carrier that is tethered to the cage structure while it is submerged. In another embodiment, ocean-positioning signals having increased positional accuracy when corrected for differential positioning error may be transmitted from a shore station through shore-based radio telemetry to the antenna receiver of the platform. Alternatively, the cage structure can have an underwater receiver that receives ocean-positioning signals transmitted underwater from a transducer placed in a fixed position on the ocean floor.

The open-ocean platform can employ a combination of technologies for its power and propulsion system, such as a Stirling-type heat sink engine, using cold ocean water inducted through a tube extending to deeper ocean depths for driving its heat exchange cycle. The Stirling heat sink engine employs the thermal gradient of the oceanic water column, similar to the operating principle of ocean thermal energy conversion (OTEC) systems. The Stirling-type generator preferably is a hybrid generator that uses heat provided from a supplemental heat source such as a fuel cell to power its heat exchange cycle and also reduce the depth for cold ocean water needed for the thermal gradient. The platform can also employ a storage battery system for off-peak energy storage and power backup.

As another aspect of the invention, a submersible open-ocean platform for maintaining a healthy growing environment for an open-ocean fish resource comprises:

(a) a submersible cage structure for use in the open ocean for confining growth of an open-ocean fish resource within a cage volume contained therein, said submersible cage structure being capable of submerging to a depth suitable for growth of the open-ocean fish resource confined therein and to minimize surface wave and tidal forces on the submerged cage structure;

(b) an ocean thermal energy conversion (OTEC) power and propulsion system coupled to the cage structure for generating electric power for generating and directing a propulsion force in the ocean water so as to maintain the cage structure in approximate correspondence with a predetermined geostationary position in the ocean, said OTEC power and propulsion system having a tube of extended length for inducting colder ocean water from a deeper ocean depth than the submerged depth of the cage structure for driving its heat exchange cycle using a thermal gradient of the deeper ocean depth relative to the submerged depth of the cage structure; and (c) a water flushing system coupled to the OTEC power and propulsion system for directing an effluent of the inducted colder ocean water into the cage volume of the cage structure for flushing wastes generated by the growing open-ocean fish resource contained therein and thereby maintaining a healthy growing environment for the open-ocean fish resource.

A further aspect of the invention encompasses a method of growing an open-ocean fish resource in a submersible open-ocean platform as stated above.

The invention uniquely integrates complementary marine technologies to create a new capability for open ocean aquaculture and related operations requiring unmanned, extended marine deployment in deeper ocean waters without the need for tethering or anchoring to the ocean floor. The open-ocean platform is especially suitable for growing marine fin-fish in submersible, untethered cages allowing for the cultivation of open-ocean marine aquaculture products. Ancillary features of the invention include improvements in open-ocean aquaculture cage structures, remote positioning and position sensor packages for oceanography and surveillance, hybrid energy production platforms, off-shore hydrogen generation, shore-to-ocean signal relay stations, and capability for marine exploration.

Other objects, features, and advantages of the present invention will be explained in the following detailed description of the invention having reference to the appended drawings.

DETAILED DESCRIPTION OF INVENTION

In the following detailed description of the invention, certain preferred embodiments are illustrated and described in order to provide certain specific examples for implementation of the invention. The preferred examples include certain preferred cage structures, automated positioning systems, submersible systems, food container and dispersal systems, power and propulsion systems, and water flushing systems. However, it will be recognized by one skilled in the art that many other variations and modifications may be made given the disclosed principles of the invention.

The invention employs the use of a cage structure in the ocean for containing fish or other marine resource to be grown therein. Examples of such sea cages are known, such as the SEA STATION™ cages made by Ocean Spar, LLC, of Bainbridge Island, Wash. The operation of this type of cage with a central stem and air chamber for controlling buoyancy for surfacing or submerging, and with mesh netting on its outer boundaries for containing the fish, is well known to those familiar with this field, and these components are not described in further detail herein.

Figure 1:
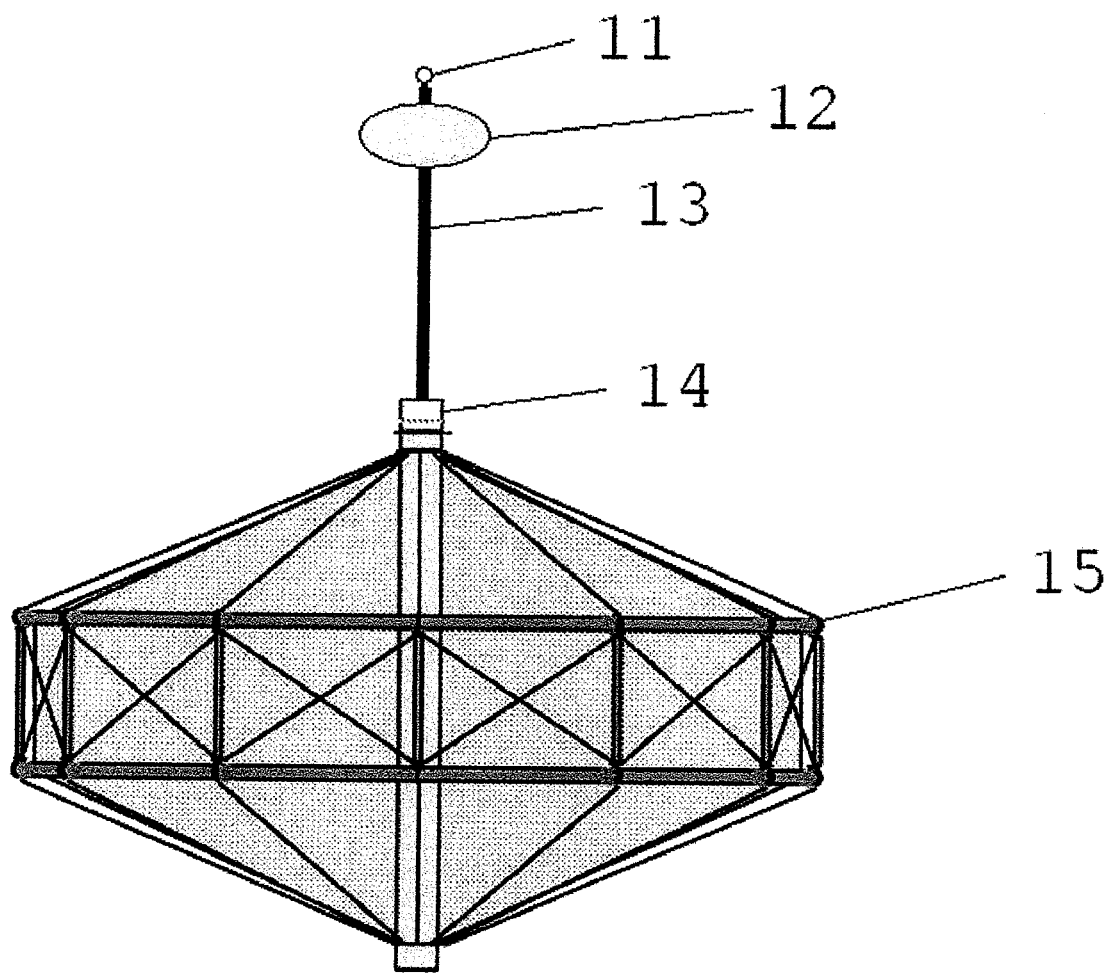
FIG. 1 schematically illustrates an automated positioning and submersible open ocean platform in accordance with the present invention.

Referring to FIG. 1, in accordance with the present invention, an automated positioning and submersible open ocean platform in accordance with the present invention has a navigation marker 11 and a signal receiver 12 on an antenna pole 13 which is attached to the top of a central stem or hull 14 for the cage structure 15 of the open-ocean platform. The cage volume enclosed within its outer mesh netting confines the growth of pelagic fin fish or other species of marine resource therein. The open-ocean platform is deployed in the open ocean environment, and multiple cages can be attached in modular fashion or deployed in a spaced pattern at sea. The signal receiver is used to receive an ocean-positioning signal transmitted from an external source (GPS, shore station, or underwater sonar buoy), and provide a geostationary-error signal for positioning the cage structure so as to maintain it in approximate correspondence with a predetermined geostationary position in which the cage is to remain positioned. This automated positioning eliminates the need to anchor the cage structure to the ocean floor or to moor it to an anchored buoy, thereby allowing it to operate in greater ocean depths, such as in the exclusive economic zone from 3 to 12 miles offshore under international protocols.

Figure 2:
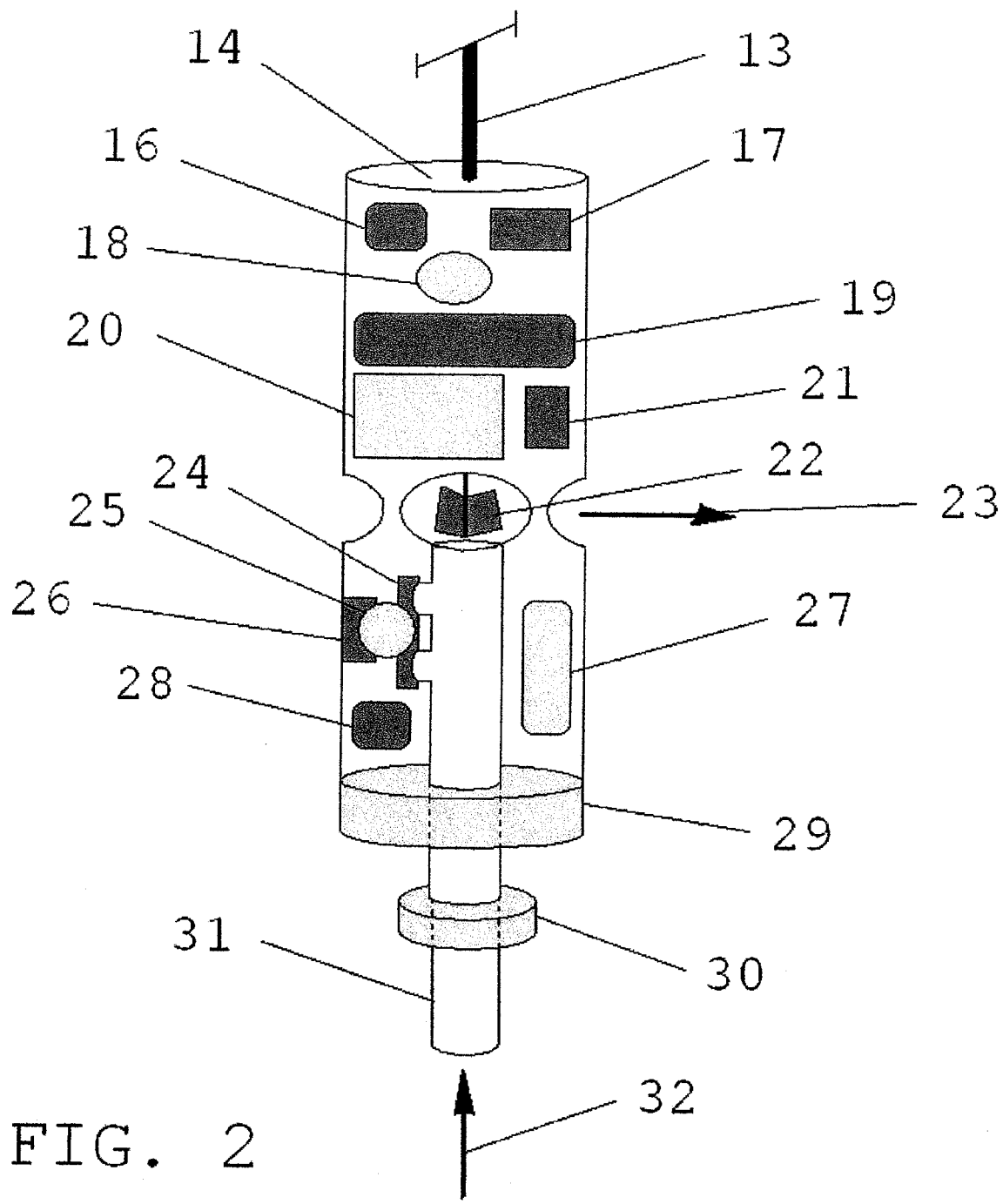
FIG. 2 is a schematic diagram illustrating the components of an ocean thermal energy conversion (OTEC) power and propulsion system for the open-ocean platform.

FIG. 2 illustrates components which may be included with an ocean thermal energy conversion (OTEC) power and propulsion system for the open-ocean platform. Within the central hull 14 mounting antenna pole 13 are a radio telemetry subsystem 16, a GPS-signal processor 17, a dynamic positioning subsystem 18, surfacing and submersion subsystem 19, batteries 20, centralized computer 20, directional control 22 for directing water jet flow 23 into the cage volume, cold water heat exchanger 24, Stirling cycle heat sink engine 25, warm water heat exchanger 26, on-board fuel supply 27, emergency sea anchor 28, ballast container 29, cold water pumping subsystem 30, and cold water inlet pipe 31 for flow of cold seawater 32.

Figure 3:
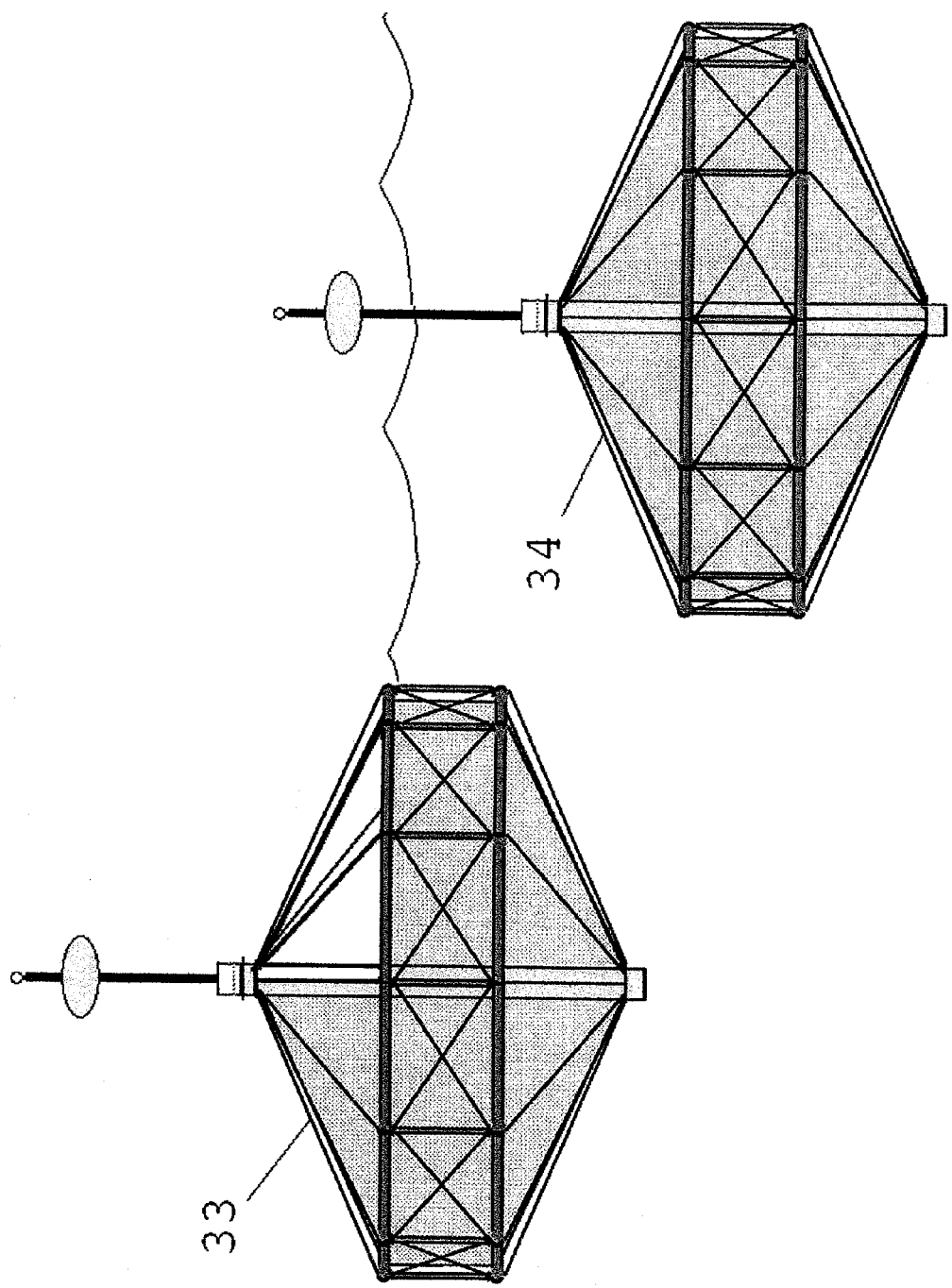
FIG. 3 schematically illustrates the open-ocean platform in surfaced and submerged positions in the open ocean environment without the need for a tether or anchor to the ocean floor.

FIG. 3 illustrates the open-ocean platform in surfaced position 33 (left side of the figure) and submerged position 34 (right side) in the open ocean environment without the need for a tether or anchor to the ocean floor.

Figure 4:
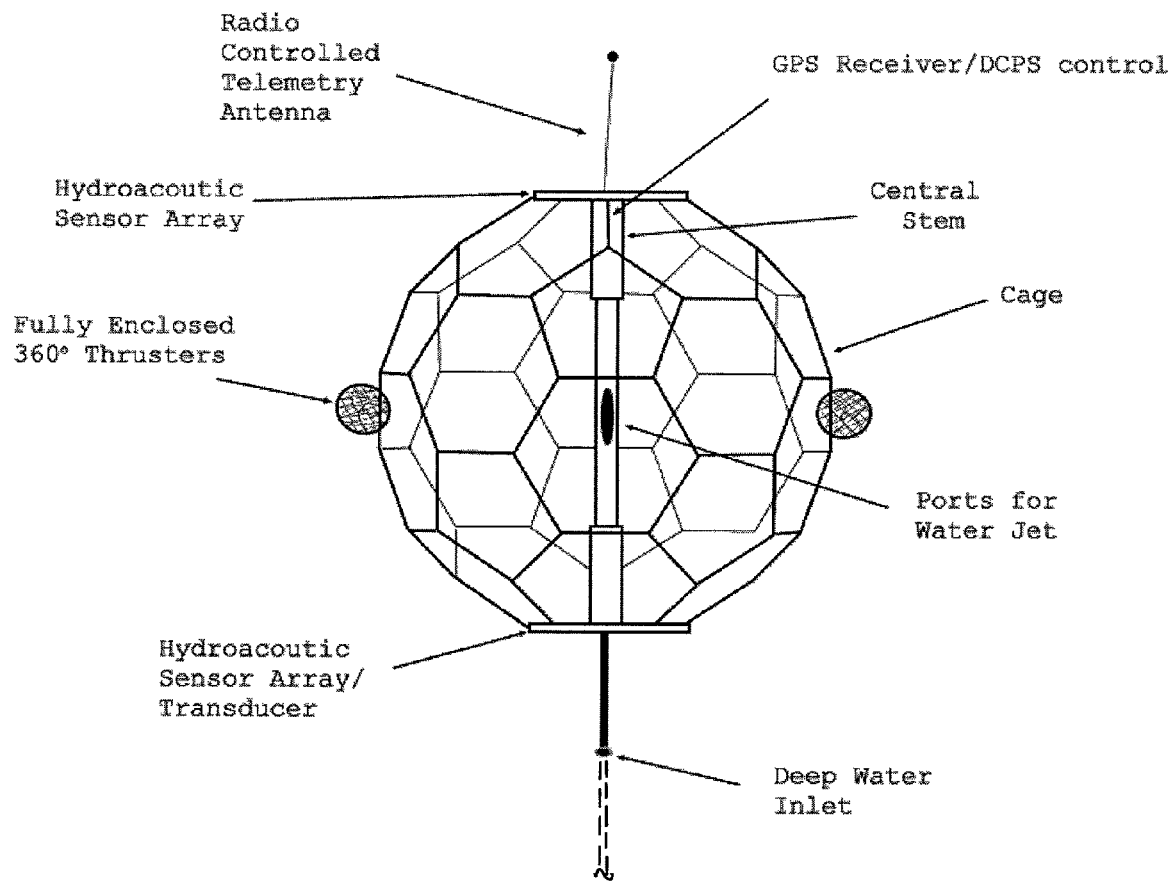
FIG. 4 shows a front view of a preferred embodiment of the open-ocean platform.

FIG. 4 shows a front view of a preferred embodiment of the open-ocean platform having a spherical cage structure and a pair of thrusters (360°) on opposite lateral sides of the cage structure for propulsion of the cage to a desired geostationary position. The central hull or stem of the platform has a radio controlled telemetry antenna pole mounted at an upper end coupled to a GPS receiver and dynamic control positioning system (DCPS) within the central stem, a deep water inlet and attached tube (dashed lines) at a lower end for inducting cold sea water from lower ocean depths for providing the thermal gradient for its OTEC generator, ports for jet flow of bacteria-free cold water effluent from the OTEC generator into the cage volume for flushing wastes and keeping its growing environment healthy. Also provided at the upper and lower ends of the central stem and cage are hydroacoustic (or optical) sensor arrays and transducer for receiving and transmitting underwater signals for positioning in the ocean and/or communicating between platforms and/or with a shore station.

The open-ocean platform may preferably use GPS signals with differential error correction relayed from a shore station. Communication to the platform is accomplished with radio control telemetry and/or acoustic/optical subsurface communication for inter and intra platform networking. The radio antenna is used to send and receive radio signals when surfacing above the water line. A GPS sensor is placed at the top to the antenna pole to maintain contact with GPS satellites when the platform is near the surface. Alternatively, the antenna and GPS sensor may be mounted on a floating carrier tethered to the cage structure. The hydroacoustic transducers are placed in an array along the top and bottom of the platform for inter platform communication and networking. The platform is equipped with fully enclosed 360° electric-powered thrusters on opposite lateral sides providing 180° steerable mobility in its depth plane. For aquaculture, the cage may be formed in a rigid sphere made up of tubular sections assembled modularly with each module netted in biofouling-resistant mesh.

Figures 5A, 5B:
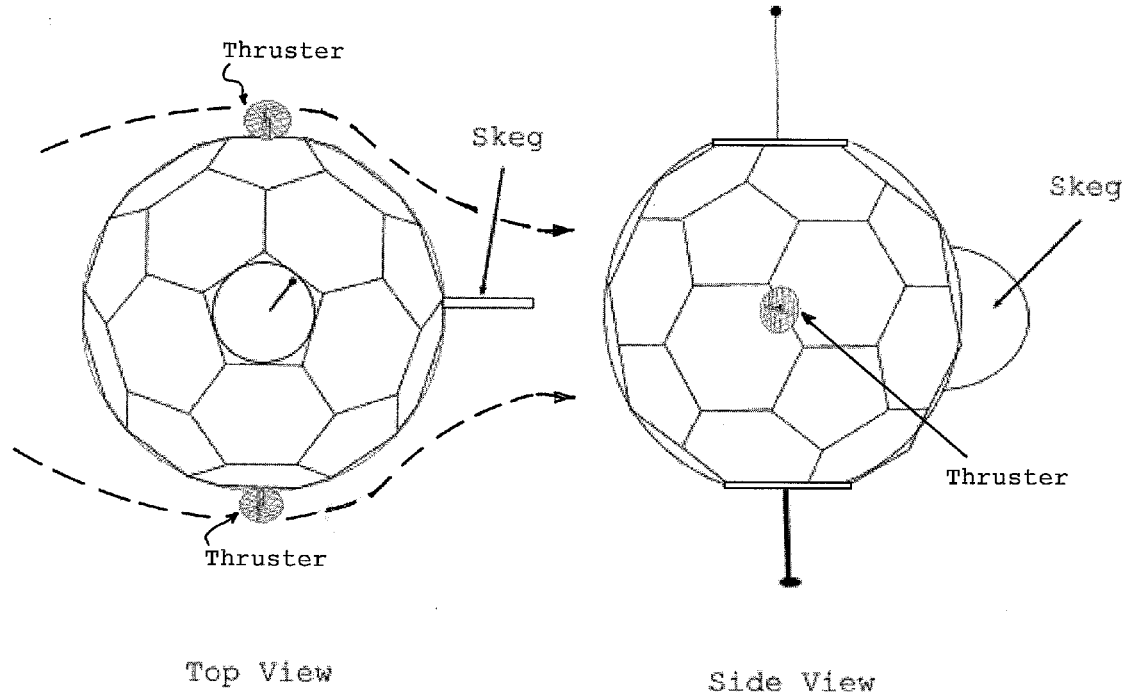
FIGS. 5A and 5B show top and side views of the preferred embodiment of the open-ocean platform in FIG. 4.

FIGS. 5A and 5B show top and side views of the preferred embodiment of the open-ocean platform in FIG. 4. A vertically oriented skeg is provided at the trailing lateral side of the cage to stabilize the cage from a tendency toward rotational movement in an ocean current flow.

Figure 6:
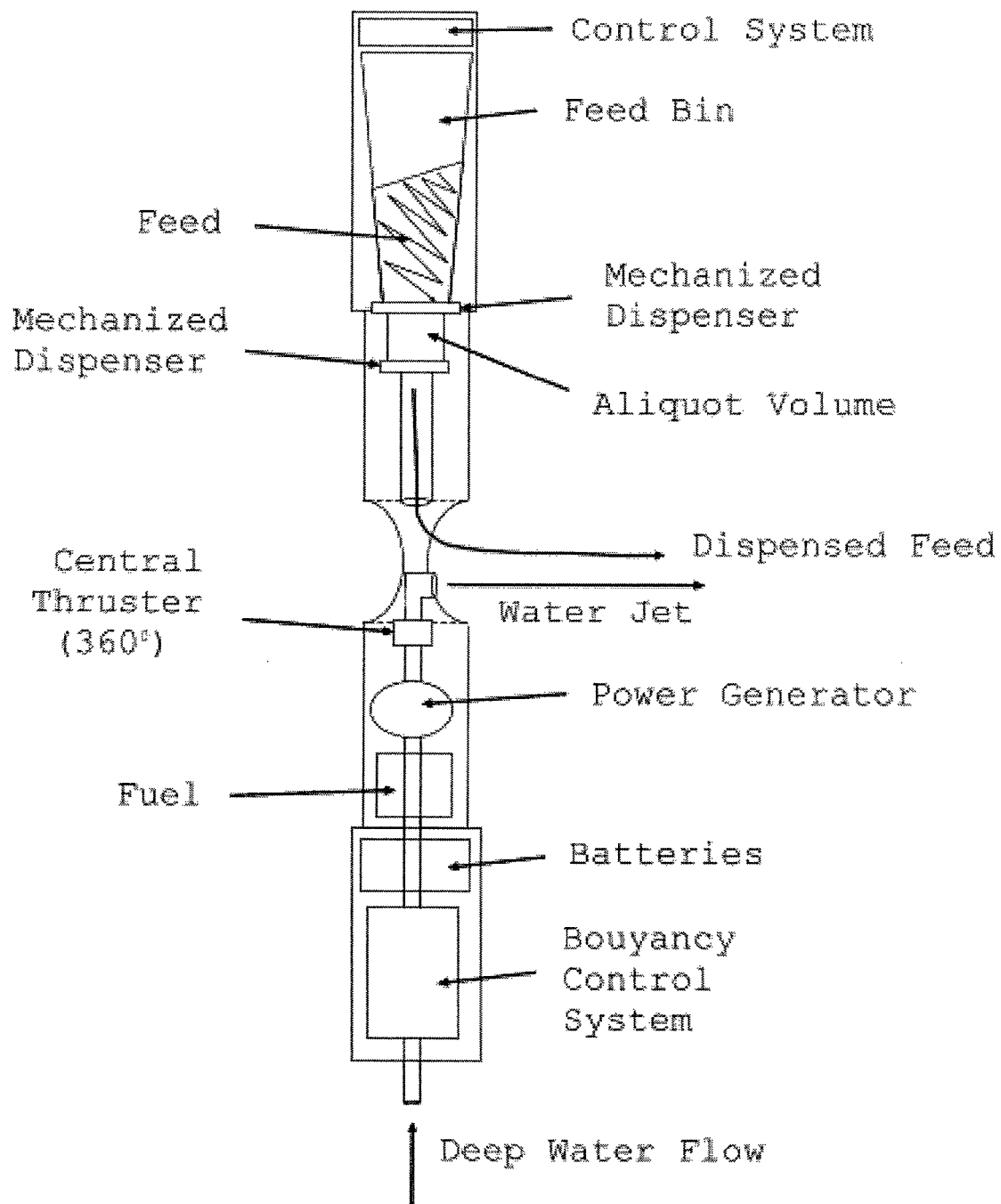
FIG. 6 is a schematic diagram of a central stem of the open-ocean platform containing a food container and dispersal system and a power and propulsion system.

FIG. 6 shows schematically the components of the central stem of the preferred embodiment of the open-ocean platform. The GPS/DCPS control system is at the top of the stem. A high pressure feed bin will contain the feed which is pressurized with dry air. The feed will automatically be dispensed by computer activated mechanized dispenser, which releases the feed into an aliquot space. The first dispenser closes and the second mechanized dispenser opens and the feed falls into the central stem area and is dispersed though out the cage by the central thruster. Cold seawater is drawn up by the water jet thruster located in the center stem. The pumped seawater is used to drive the heat sink engine, dispense feed and help position the vessel. All subsystems are electric power by the hybrid power generator and with backup batteries. The vessel remains in the up right position by buoyancy compensation device at the bottom of the central stem. The buoyancy compensation device will draw air from the pressurized feed bin for surfacing. The central thruster directs a water jet flow of cold ocean water from the deep water flow passed through an OTEC power generator into the cage volume to flush and dilute wastes and maintain a parasite and disease-free environment for the healthy growth of the fish therein. The OTEC power generator may also have backup power supplied from a fuel cell and/or from off-peak storage batteries. The buoyancy control system is used to pump air into or from a buoyancy chamber for raising the cage to or submerging it from the surface.

Figure 7:
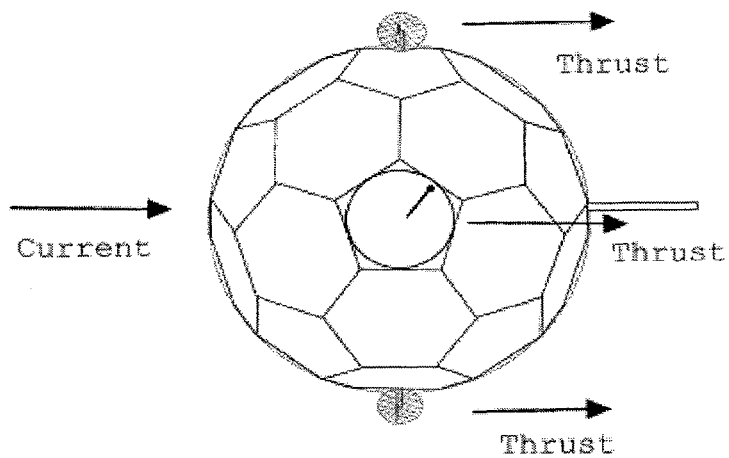
FIG. 7 illustrates the automated positioning of the open-ocean platform using its propulsion system to apply thrust against the prevailing current in order to maintain the station in a predetermined geostationary position.

FIG. 7 illustrates the automated positioning of the open-ocean platform using its propulsion system to apply thrust against the prevailing current in order to maintain the station toward a predetermined geostationary position. The skeg provides a stabilizing force to keep the cage from a tendency to rotation in the current.

Figure 8:
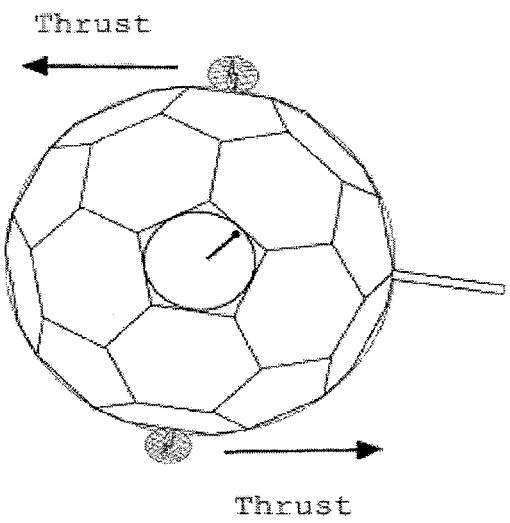
FIG. 8 illustrates a turning maneuver of the open-ocean platform by applying variable thrust and direction to right and left side thrusters.

FIG. 8 illustrates a turning maneuver of the open-ocean platform by applying variable thrust and direction to right and left side thrusters. Again, the skeg provides a stabilizing force to keep the cage from a tendency to over-rotate with the thrust provided for turning.

Figure 9A:
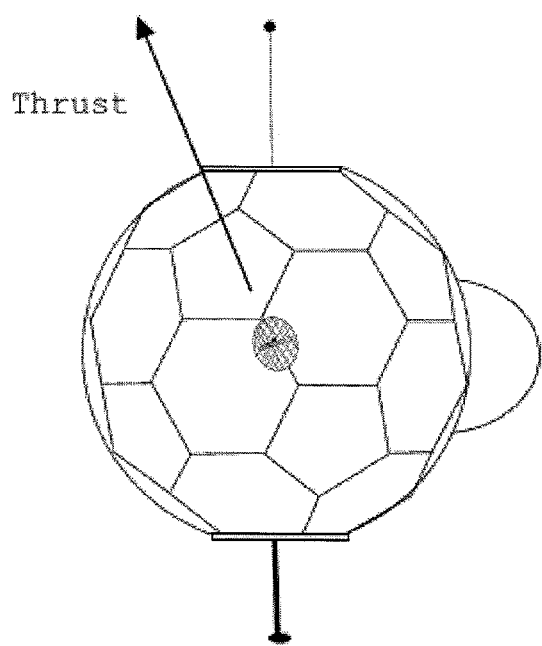
FIG. 9A illustrates the open-ocean platform submerging using its side thrusters along with its buoyancy control.
Figure 9B:
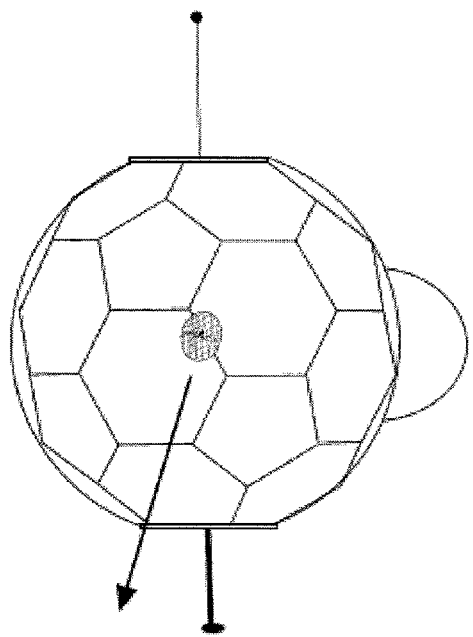
FIG. 9B shows it using its side thrusters for surfacing.

FIG. 9A illustrates the open-ocean platform submerging using a directional thruster along with its buoyancy control, and FIG. 9B using its directional thruster for surfacing. The platform will be able to submerge by flooding the buoyancy control tank and rotating the side 360° thrusters shown on the right. The platform will surface by pumping air into the buoyancy control tank and rotating the thrusters to provide thrust in the upwards direction.

Figure 10:
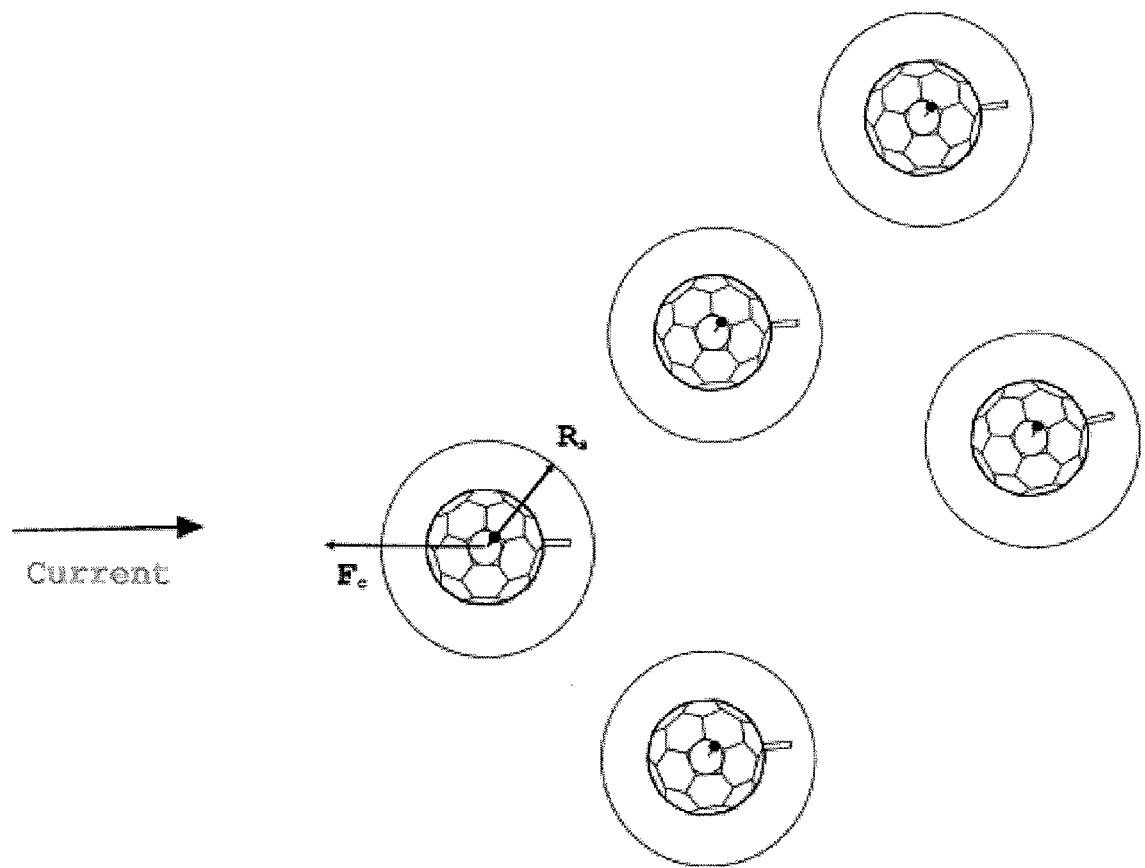
FIG. 10 illustrates deployment of multiple open-ocean platform structures in a designated ocean zone.

FIG. 10 illustrates deployment of multiple open-ocean platform structures in a designated ocean zone. The cages are preferably positioned in a flying V pattern facing towards the oncoming direction of the prevailing ocean current. The platforms can maintain a safe spacing between themselves by using an array of hydroacoustic transducers to listen for the sound of the other platforms. When the sound exceeds a threshold, a cage can be directed with its propulsion system to move away from the direction of the sound. In this figure, $R_S$ is the safe radius area, and $F_C$ is the force necessary to maintain the platform position against the current.

Figure 11:
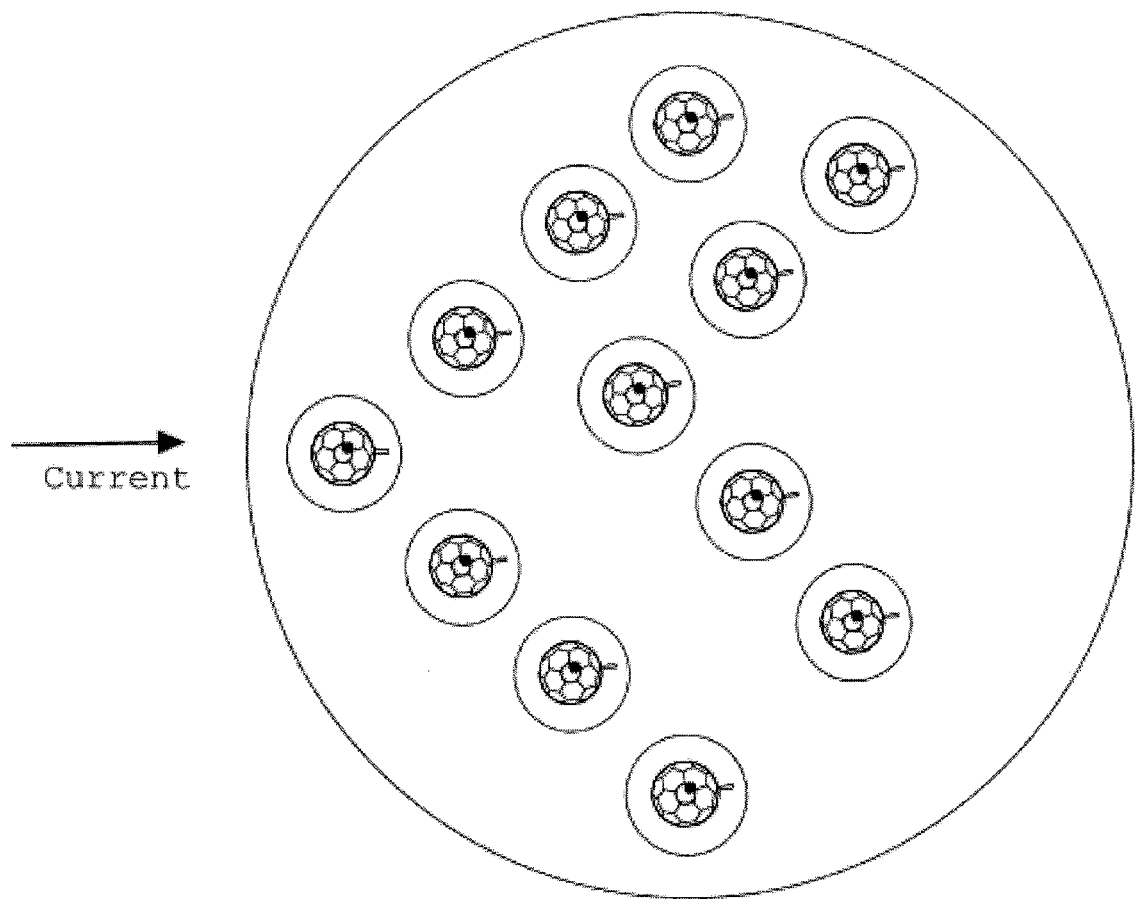
FIG. 11 illustrates a preferred pattern for spacing of multiple cage structures in a designated ocean zone.

FIG. 11 illustrates the flying V pattern for spacing of multiple cage structures in a designated ocean zone. A spacing control algorithm uses the acoustic transducer array to sense the other platforms and formulate the flying V pattern and the position of the platforms relative to the differential position and the desired spacing model.

The open-ocean fish-growing cage platform dynamically and continuously applies corrective thrust force from the thruster units to steer toward a target geostationary position within a defined area, such as a designated unit position within an aquaculture lease zone of a designated operator. Its on-board geostationary-position-correction controller derives a geostationary-error signal for the cage structure in the ocean based on an ocean-positioning signal received by its signal-receiving unit. The geostationary-error signal is then used to derive thruster command signals to direct the thruster units to generate a corrective propulsion force to steer the cage structure continuously toward the desired target geostationary position.

Figure 12A:
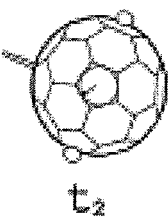
FIG. 12A illustrates an example of the geostationary-error-correction sequence for the open ocean platform structure.
Figure 12A:
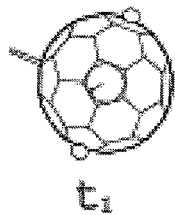

FIG. 12A illustrates an example of the geostationary-error-correction sequence. The unit's controller will calculate an expected current drift direction and magnitude with the aid of received GPS signals or the shore-based differential GPS signals. As the ocean current is projected to carry the unit's platform away from its preprogrammed target position, the controller will log the drift away from the reference position and the change in the GPS position and calculate an instantaneous current vector $V_c$. The current vector $V_c$ will be used by the controller in a hydrodynamic model for platform motion to calculate a thruster (heading and magnitude) correction vector. The thruster correction vector will be applied to the thruster units to command their direction and magnitude of power. At the next time increment for the correction sequence, the current vector $V_c$ will again be measured as described above and then a new thrust correction vector will be calculated and applied.

Figure 12B:
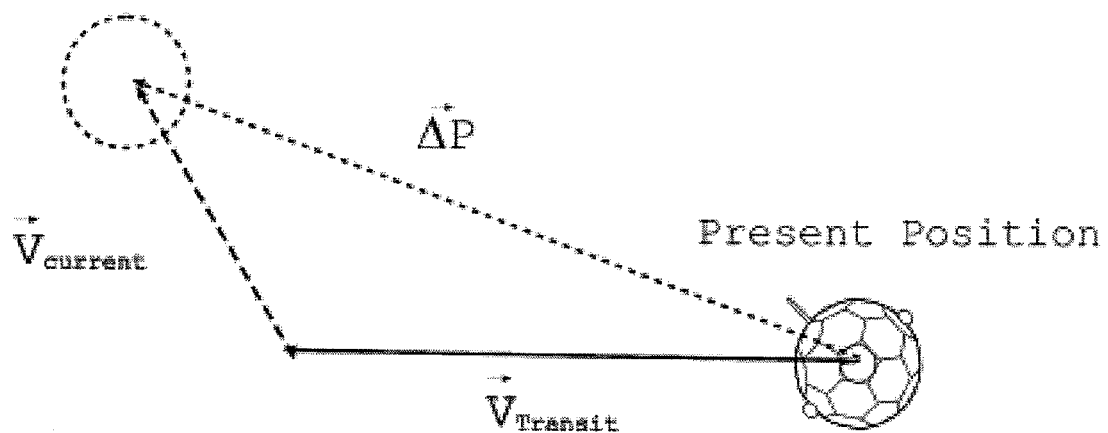
FIG. 12B illustrates calculation of a transit vector $V_{transit}$ for thruster correction.

A filter such as a Kalman filter will be applied to all available data to determine true position. The Kalman filter, developed by Rudolf Kalman, is an efficient recursive filter that estimates the state of a dynamic system from a series of incomplete and noisy measurements. If the present position of the platform is displaced from its target (station) position, it will calculate the difference vector $\Delta P$ between its present position and the target station position, then subtract the current vector $V_c$ (as calculated above) in order to determine the transit vector $V_{transit}$, as shown in FIG. 12B. The transit vector $V_{transit}$ indicates the correction path the cage must transit in order to restore its position to the target station position. The thruster correction vector is accordingly derived from the transit vector $V_{transit}$.

Figure 12C:
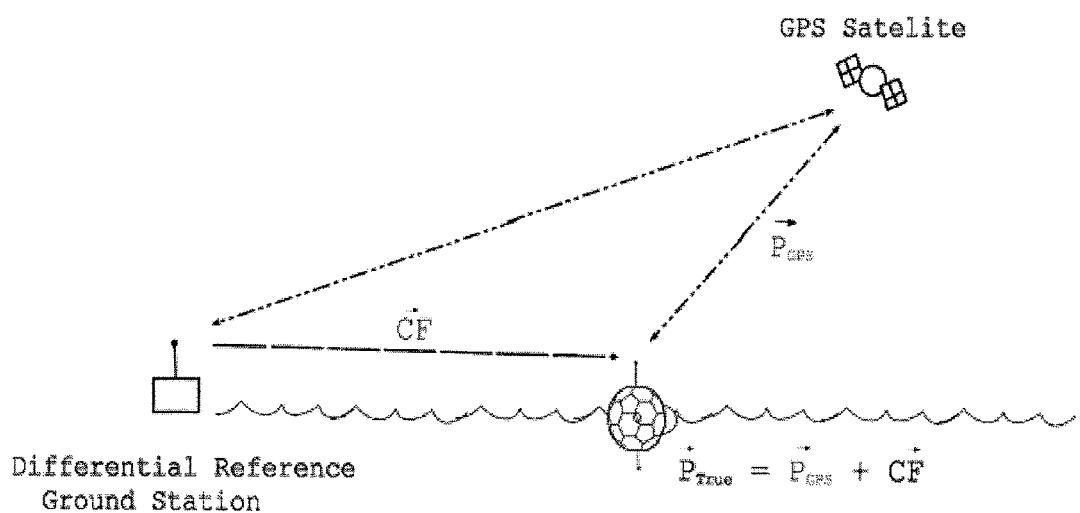
FIG. 12C illustrates differential correction using a second GPS receiver at a shore station for more accurate determination of a platform's current position.

In a preferred embodiment, the open-ocean fish-growing cage platform derives its geostationary-error signal based on differential position GPS signals received from the shore station for more accurate error determination. The GPS system of geosynchronous satellite position transponders has been designed to be accurate, however, there are errors caused by Atmospheric Conditions, Ephemeris Errors (Clock Drift/Measurement Noise), Selective Availability (Department of Defense alterations), and Multipath caused by reflections. Collectively these errors can add up to an overall error of 15 meters of uncertainty. Differential correction is necessary to get accuracies within 1 to 3 meters. As illustrated in FIG. 12C, differential correction requires a second GPS receiver at a base station collecting data at a stationary position on a precisely known point, such as at a shore station within radio transmission proximity to the fish-growing cage units within their lease zone. The physical location of the reference location is known, therefore a correction factor can be calculated and compared to the reference location with the GPS location determined by using the same satellites. The shore station downloads current GPS position coordinates transmitted from the platform and compares them to the shore station's more accurately known position coordinates to derive differential coordinates to more accurately pinpoint the platform's current position. This correction factor is then transmitted to the platform which uses the correction factor in its calculation for its current position.

Figure 12D:
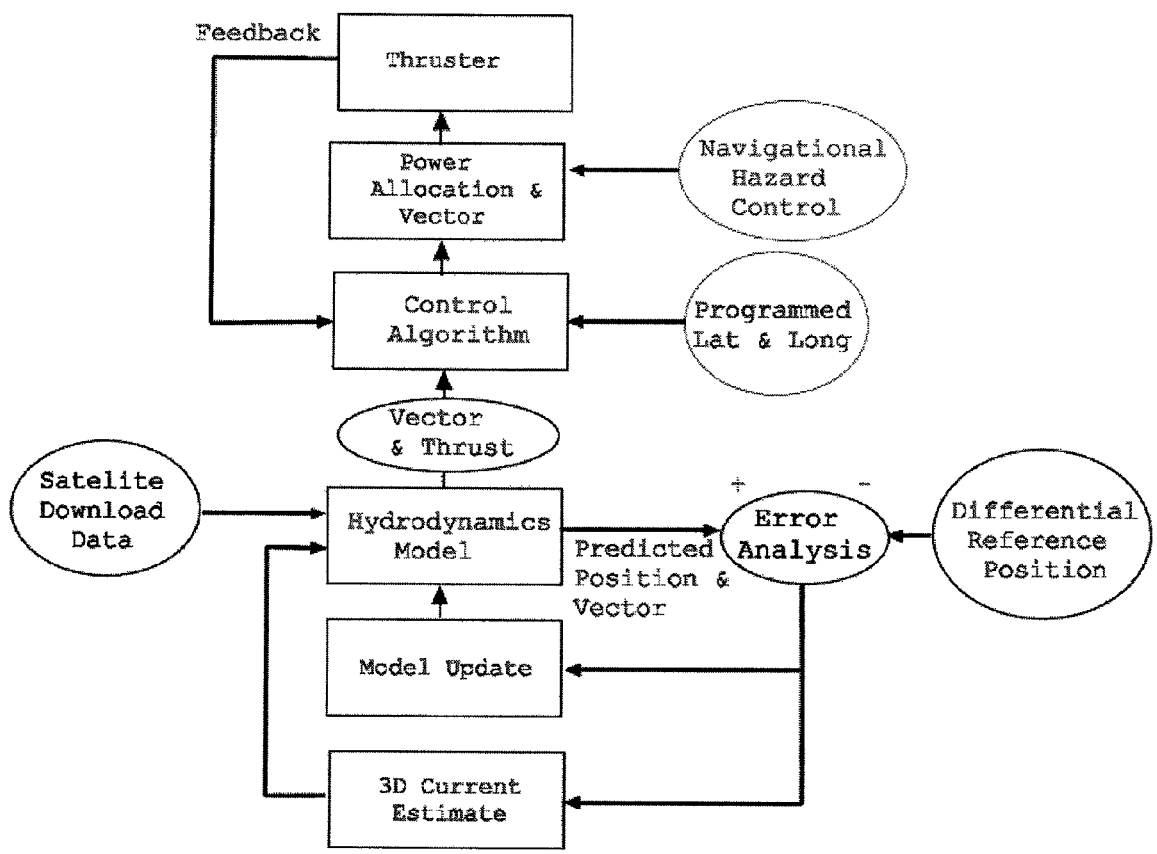
FIG. 12D is a schematic diagram illustrating the position correction functions performed onboard the open-ocean platform.

FIG. 12D is a schematic diagram illustrating the position correction functions performed onboard the open-ocean platform. The Hydrodynamics Model receives GPS Satellite Download Data and/or Differential Reference Position signals (from the shore station) to calculate the predicted position and vector. The Error Analysis function is performed to take into account Update data on the model's position, and also to take into account any Current Estimate (current vector $V_c$) calculated for projected current drift. The Hydrodynamics Model uses a standard mathematical model for platform motion that is based on expected hydrodynamic and aerodynamic aspects such as mass and drag. The platform's position and heading relative to the differential position are fed into the system and continuously compared with the prediction made by the model. This difference is used to update the model by using a filtering technique.

The preferred platform Hydrodynamic Model will be continually updated and corrected with Differential Reference Position signals from the shore station. Model Update data on wind, weather, currents and position will be fed into the model through satellite downloads. The Hydrodynamic Model will perform its correction calculations and pass the correction vectors to the thruster Control Algorithm. The Control Algorithm calculates Power Allocation & Vector for each thruster unit. The preferred Control Algorithm also has input from feedback from the thrusters. Each thruster's power will be monitored by internal sensors and reported back to the control algorithm to allow for correction for changing power spectrum and drift. A separate navigational hazard control algorithm will override control in the event of an unanticipated vessel approach. The approaching vessel will be sensed by the transducer array and reported directly to the navigational hazard control algorithm.

Preferably, each platform will run an intra-platform control algorithm and an inter-platform control algorithm. The intra-platform control algorithm is responsible for maintaining each platform's absolute position relative to the Global Positioning System and differential position relative to the shore station. The inter-platform algorithm will be secondary to the intra-platform algorithm but and operative to maintain the subject platform's position relative to other platforms (e.g., its position in the flying V pattern) within the designated lease area. The platforms will communicate among each other through the hydro-acoustic transducer arrays.

Figure 13:
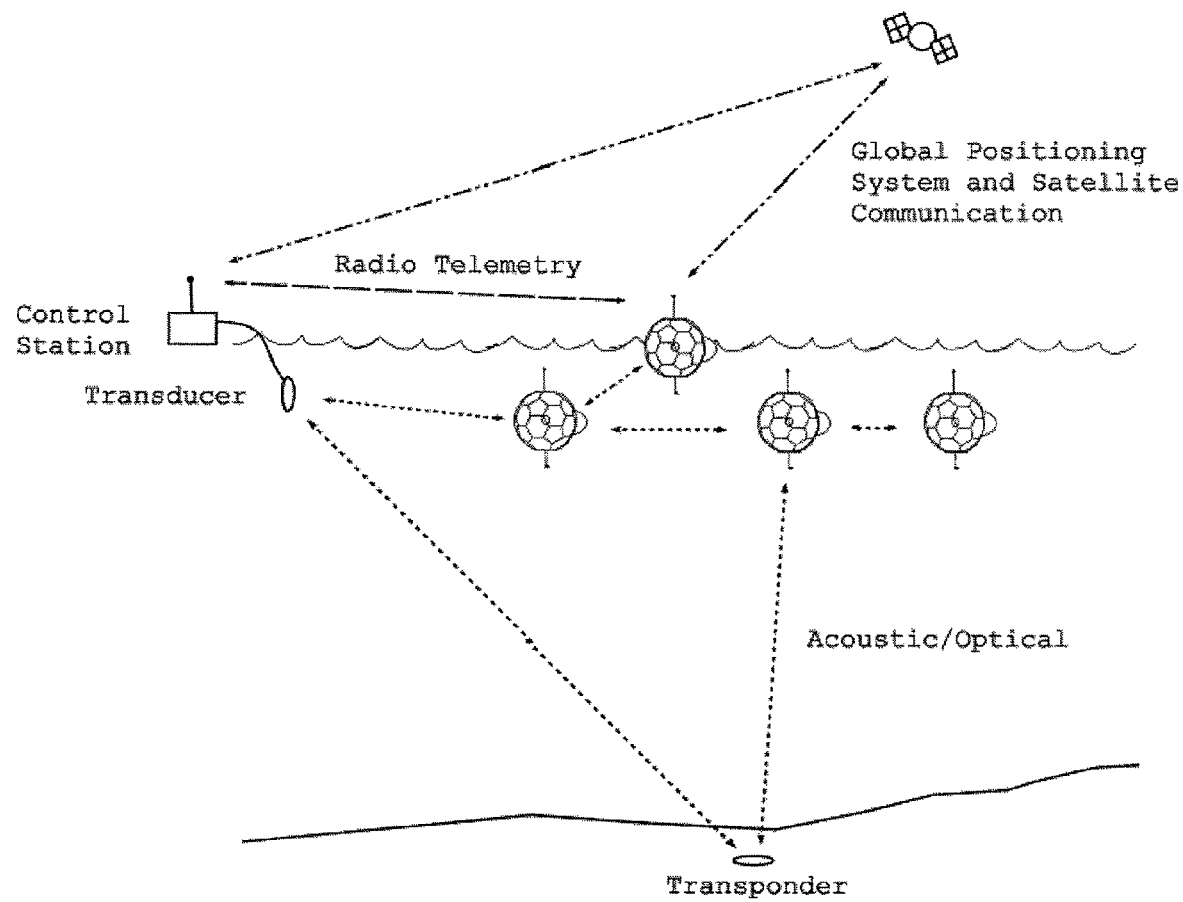
FIG. 13 is a schematic drawing illustrating a backup or alternative platform communication method employing an underwater position transponder.

A backup or alternative platform communication method employing an underwater position transponder is illustrated in FIG. 13. A Control Station, which may be a shore station or a marine vessel or both, has a transducer which is positioned in the water to send and receive communication signals to and from the platforms at sea via a transponder placed on the ocean floor in their proximity at a known coordinate location. The transducer can send an acoustic or optical signal (by means of piezoelectric elements) to the transponder, which is triggered to reply. As the velocity of sound through water is known, the distance is known. The platforms can exchange communication signals with the transponder through their transducer arrays. This back up communication system can be used while the platform is submerged and not in contact with the GPS satellites the shore station's radio transmitter. The shore station's transducer is used to relay data from the Control Station to the platform and from the platform to the Control Station. Control over the platforms can thus be managed by the Control Station at all times. Control may also be maintained by radio telemetry for shorter distances within line-of-sight, and through satellite communication for longer distances.

Figure 14:
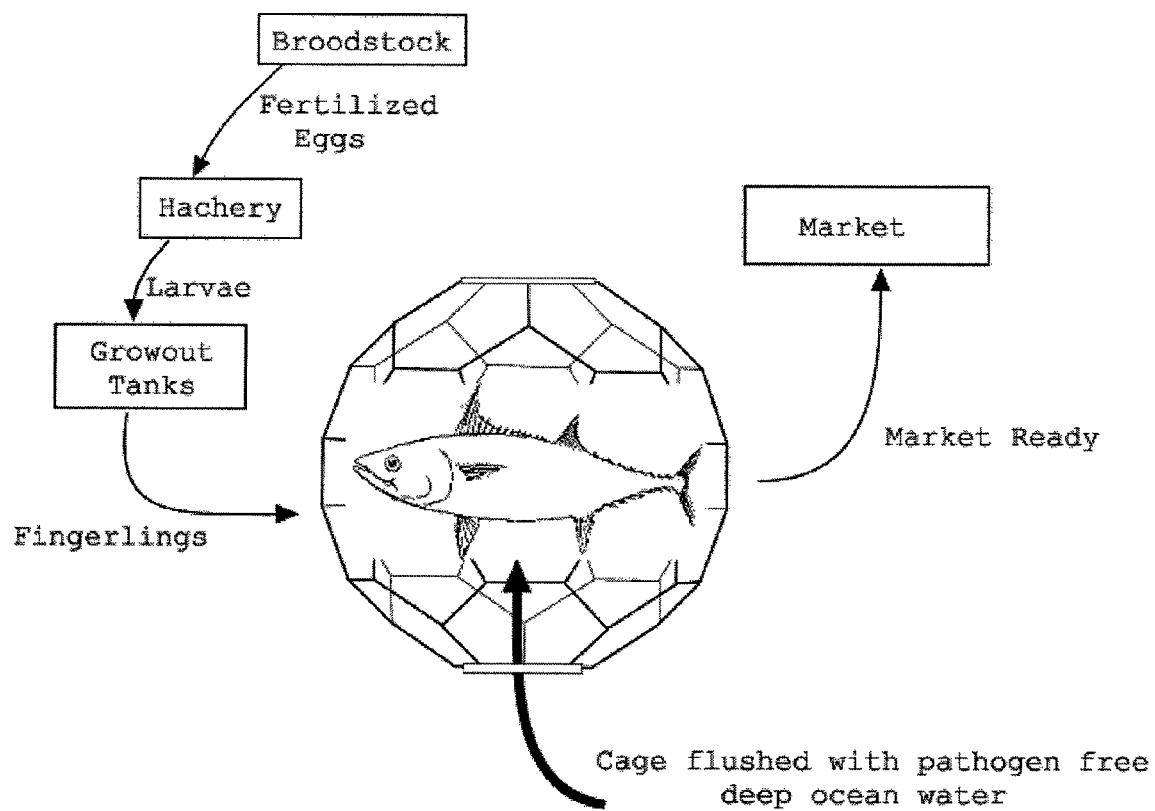
FIG. 14 illustrates the growth cycle for a marine fin fish using the open-ocean platform for the maturation part of the cycle from fingerling to adult growth stage.

The open-ocean fish-growing cage platform is designed to handle the maturation part of the growing cycle of the fish livestock in the ocean. As illustrated in FIG. 14, in the case of marine fin fish, the lifecycle starts with the brookstock spawning and the collection of fertilized eggs. The eggs are transferred to the hatchery where the eggs hatch and are grown to larvae stage. The larvae are then transferred to grow out tanks and grown to the fingerling size. The fingerlings will be transferred to the open ocean platform and raised to the time when they are at full market size. The open-ocean platforms provide a natural environment in the ocean for the maturation growth stage of the fin fish. The growing environment is enhanced by continuous flushing of the cage with pathogen-free, deep ocean water which is pulled up from lower depths to be used for the OTEC engines. When they have reached a desired adult size, the fish are then harvested from the platform and brought to market.

Figure 15:
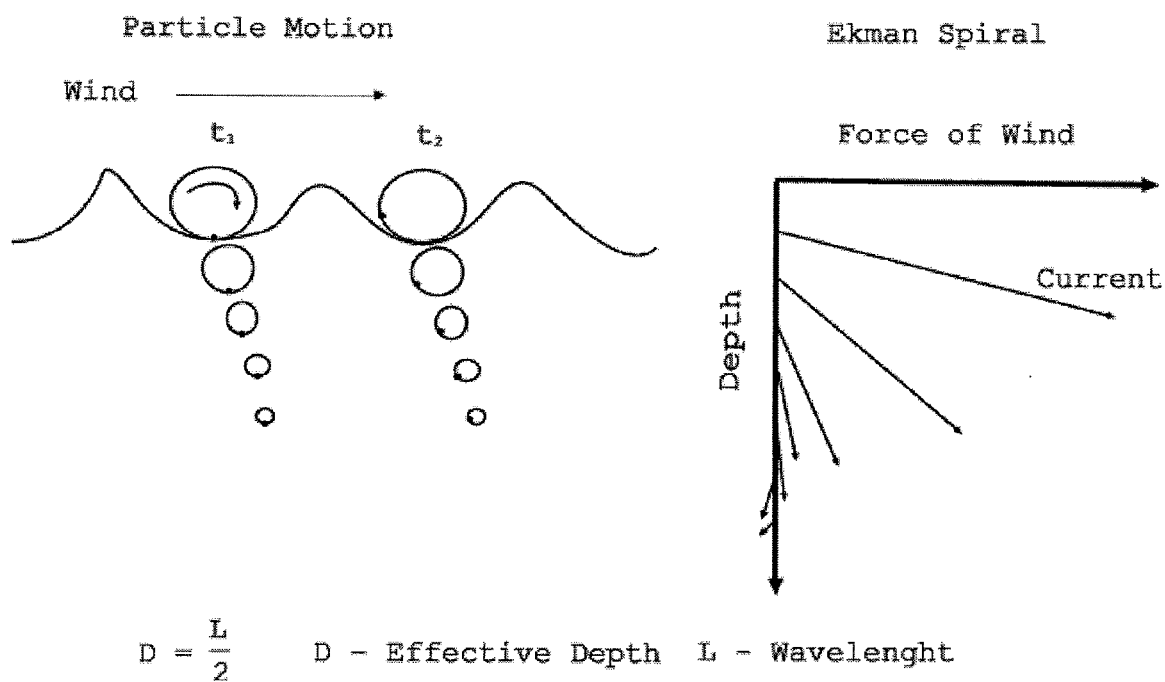
FIG. 15 illustrates the decreasing effect of surface waves on the open-ocean platform with increasing depth in the ocean.

FIG. 15 illustrates the decreasing effect of surface waves on the open-ocean platform with increasing depth in the ocean. The force of the wind over the surface of the ocean causes wave particles to move in circular orbits which decrease in diameter with depth, and the stress is transported in layers which causes an Ekman Spiral which moves toward the right in the Northern Hemisphere (due to the Coriolis Effect) and decreases with depth. The effective depth of wave action on the surface of the ocean is the wavelength of the waves divided by 2. For example, the average wave period near Hawaii is about 5 seconds to 7 seconds in the summer, and 6 seconds to 9 seconds in the winter. Using average wave height and average wave period, the typical wavelength is calculated to be approximately 120 to 130 feet. Therefore, placing the platform below a depth of about 60 to 70 feet will result in very little turbulence forces from surface winds and waves on the submerged cage.

Figure 16A:
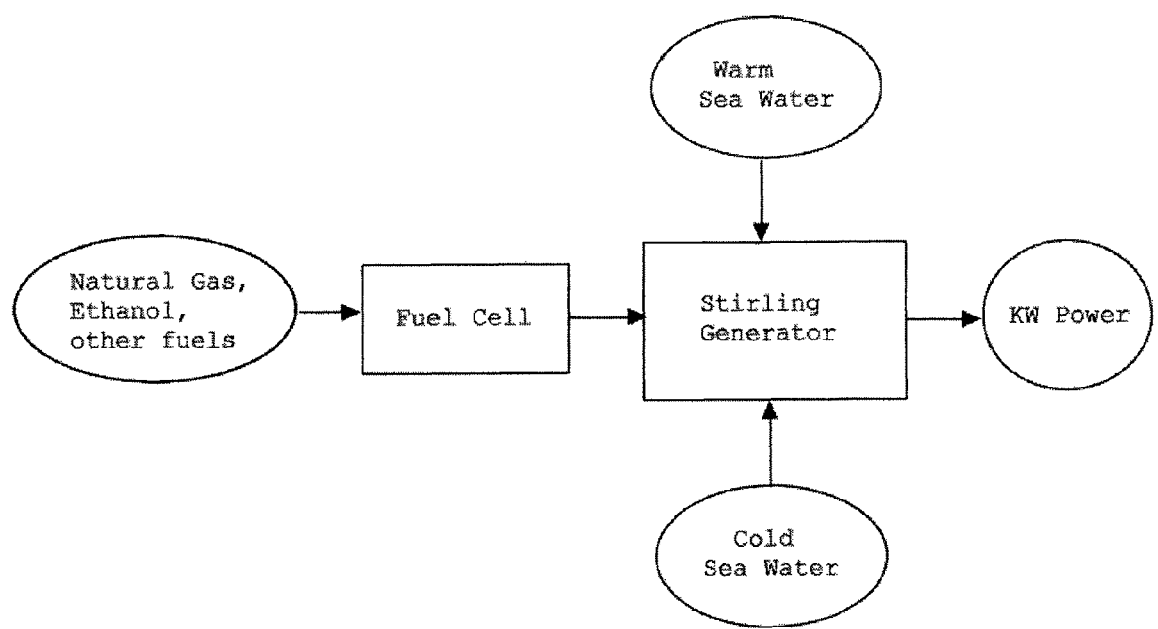
FIG. 16A illustrates the integration of power generation system with deep-water cage flushing in the open-ocean, fish-growing platform.

As illustrated in FIG. 16A, each open-ocean, fish-growing platform has complete integration of its power generation system with deep-water cage flushing. The design of the power plant allows for the generation of electricity at any depth by inducting cold sea water through a pipe extending to lower ocean depths. The hot side of the Carnot cycle which drives a Stirling Generator will be heated by a fuel cell unit, using high BTU fuels stored in a fuel container onboard. The warm sea water around the platform at its submerged depth will set up a thermo-gradient with the inducted cold sea water which partially drives the Stirling Generator. In this way, a shorter cooling pipe can be used as compared to a Rankine cycle OTEC plant. For example, when the platform is in the submerged position, the Stirling Generator will be at about 30-50 meters depth and located in the warm surface layer of 26° C. The platform can pump up water from 90 meters depth which is the top of the themocline of approximately 19° C., which will drive the cold side of the Carnot cycle. In this way a thermo gradient will be produced to enhance power generation. Combined heat/power generators, such as described, have high efficiency of fuel conversion theorized to be as high as 70%. Along with the thermo-gradient partially driving the Stirling engine Carnot cycle, the fuel conversion to electricity is the highest among conventional submerged Stirling engine systems.

Figure 16B:
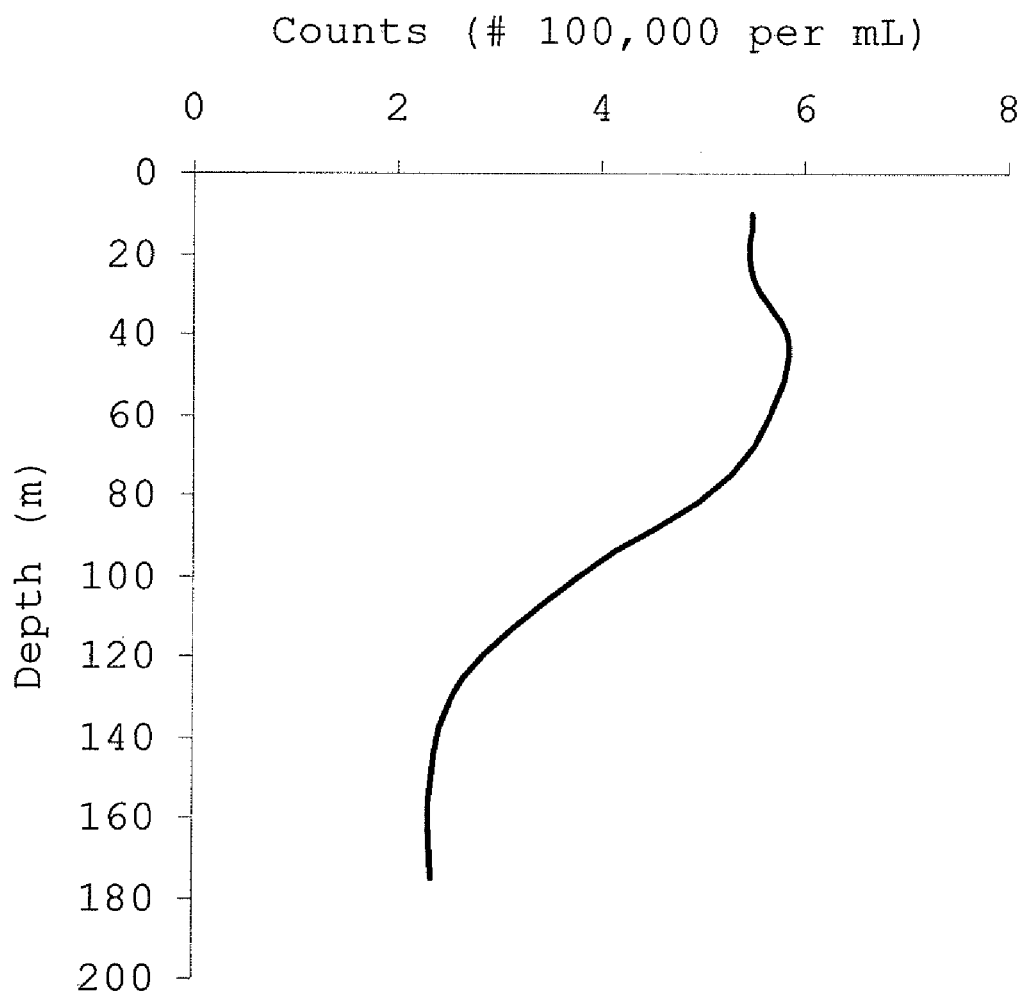
FIG. 16B is a graph comparing bacteria levels in deep ocean seawater compared to surface seawater.

The pathogen-free cold sea water is output from the Stirling Generator into the cage volume for continuously diluting and/or diffusing wastes and pathogens from the cage, in order to maintain a healthy growing environment. Deep ocean seawater contains fewer microbes than surface seawater. FIG. 16B shows a depth profile comparison of heterotrophic bacterial counts of seawater samples taken at depth with a bottle CTD rosette, during the Hawaii Ocean Time-Series experiment during the year of 2005 at station ALOHA. As can be seen in the figure, bacterial counts are nearly 6×105 counts per mL at 20 m depth and half that value at 90 m depth of 3×105 counts per mL. The platform will continually flush the cage with water from 90 m depth which contains less heterotrophic bacteria then surface water.

The power output of the above type of Stirling Generator is expected to readily meet thruster power requirements for geostationary positioning, as well as other onboard uses. The force of drag of a spherical object in a current is modeled as shown in the equation below.

$$F_d = C_d \frac{1}{2} \rho v^2 A \vec{v}$$

Figure 16C:
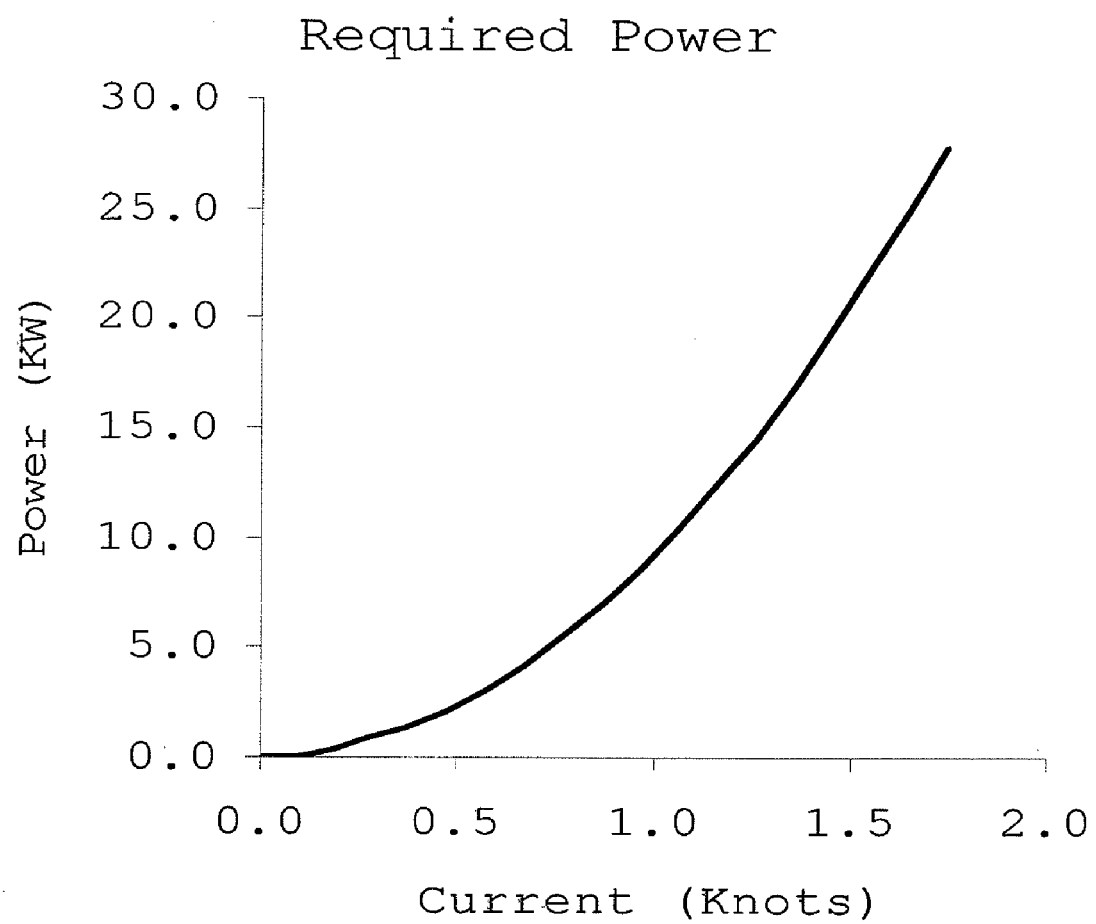
FIG. 16C is a graph showing estimated power requirement for thruster correction of a typical spherical cage platform against varying current strengths.

=here, Fd=force of drag, Cd=drag coefficient, ρ=density of fluid, v=velocity, A=cross sectional area exposed to current, and the unit vector specifies direction opposite the current direction. A smooth solid sphere has a drag coefficient of 0.1× the cross section area A of the cage. A typical cage construction will be mostly open area with 0.08 inch mesh netting mounted on the outer periphery of its skeleton, with one inch squares ribbing that takes up 16% of the area. Therefore, the effective cross sectional area would be roughly 30% when considering the platform itself and the mesh. FIG. 16C is a graph showing the estimated power requirement for a 27 m radius spherical cage platform with 30% of its cross sectional area exposed, against varying current strengths. The power requirement to maintain the station against a one-knot current is computed to be about 8.5 kilowatts, which is well within the output range of the combined heat/power as described above. Two such Stirling Generators can deliver up to 50 KW of continuous power, and also provide redundancy if one unit malfunctions.

For ongoing fish-growing operation, the cage platform will have the onboard food dispenser as described previously. For fin fish such as tuna, the dispenser can dispense pelletized feed made from soybeans. The automated feed bin will be on board and pressurized with dry air. A computer will control the feeding times and monitor the amount of feed. A feed boat will visit the aquaculture site and dispense tuna feed to the platform at periodic intervals.

Harvesting and maintenance of the cages will be conducted at sea from surface vessels. The platform will be constructed of biofouling resistant materials such as spectraline. By submerging the cages, they will not be in direct sunlight most of the time due to the attenuation of light through water, and this will slow the biofouling process. The platform will submerge to be shielded from winds, storms, piracy and collision with ships, much like a stationary submarine and can operate in deep waters away from the coast and have the ability to self position, thereby maintaining valuable coastline views. The platform is designed to be placed in deep within miles from the coast, giving the power plant access to cold water while maintaining a high degree of monitoring over planned open ocean aquaculture operations.

The self-positioning ocean-going platform using the hybrid OTEC system can also be designed to use its power output for hydrogen generation from seawater. Hydrogen may soon become widely in demand as a fuel for fuel cell and hydrogen-powered cars. It would be an advantage to produce hydrogen at sea where shore space is scarce and valuable. Floating OTEC plants would also be more economical then land based OTEC plants because the piping of cold water from lower ocean depths would be much shorter, thereby cutting down on pumping energy cost.

ADVANTAGES OF THE INVENTION

The dynamically positioning of the open ocean platform allows for full freedom of motion and removes the need for any mooring systems, tethers, or anchors. The platform can operate well off shore to minimize the visual impact on the coast, and maximize the number of units that can be deployed. It will be self-positioning by employing GPS, computer automated and controllable via radio telemetry. The open ocean aquaculture cages would provide for scalability of production in oligotrophic waters to allow for the complete aerobic decomposition of excess feed and metabolites. Nearshore tuna pens and tethered cages pose a hazard to the coastal environment due to effluent accumulation and large scale production of tuna may not be environmental viable. Aquaculture farms operating in deep water in the open ocean would allow large scale production while providing adequate mixing and complete aerobic decomposition of farm effluent. The open-ocean platform will continuously flush the cage with fresh seawater pumped up from below the platform. Sea water taken at depth has low amounts of microbes and therefore pathogens. This will ensure that the fish will experience less disease and parasites. The need for an open ocean aquaculture process is driven by the world demand for seafood and declining catches from natural fisheries. An open ocean aquaculture process would take pressure off of natural populations and allow a rebound of marine wildlife.

The hybrid Stirling engine and Ocean Thermal Energy Conversion (OTEC) power plant provides integrated heat/power generation along with pathogen-free cold water flushing. The invention enables extended open ocean operations and the ability to harvest the unlimited potential of ocean resources. The oceanic platform driven by a hybrid OTEC is particularly suited for aquaculture, as the deep ocean water is cold, pre-industrial, pathogen free and relatively free of biofouling organisms. As a result, the deep cold water has been shown to not biofoul heat exchangers. The warm water heat exchanger will be in thermal equilibrium with the surrounding oceanic water thereby further avoiding biofouling. Also anti-biofouling materials such as Cu—Bi alloys and chemical compositions of vinyl will be used on surfaces exposed to seawater.

It is understood that many modifications and variations may be devised given the above description of the principles of the invention. It is intended that all such modifications and variations be considered as within the spirit and scope of this invention, as defined in the following claims.

The invention claimed is:
1. A fully integrated autonomous submersible aquatic structure for growing fish comprising:
(a) a cage for growing fish within a cage volume contained therein;
(b) a remote controlled onboard dynamic positioning system capable of maintaining the aquatic structure in an approximate geostationary position below the water surface;
(c) an onboard buoyancy control system coupled to the dynamic positioning system;
(d) an onboard propulsion system internal to the cage structure coupled to the dynamic positioning system configured to propel the aquatic structure within the ocean environment in three dimensions;
wherein said remote controlled onboard dynamic positioning system communicates with the onboard buoyancy control system and the onboard propulsion system to position said structure within the ocean environment in three dimensions and to maintain said structure in an approximate geostationary position at a given depth below the water surface.

2. An aquatic structure according to claim 1, wherein said remote controlled onboard dynamic positing system comprises,
(a) a signal-receiving apparatus for receiving a positioning signal transmitted from at least one external source;
(b) a position-correction apparatus for providing a position-error signal based on the positioning signal received by the signal-receiving apparatus; and
wherein said onboard propulsion system generates a corrective propulsive force commensurate with the position-error signal provided from the position-correction apparatus so as to maintain the aquatic structure in approximate correspondence with a target geostationary position.

3. An aquatic structure according to claim 2, wherein said external source transmitting a positioning signal is selected from a group consisting of one or more of the following:
(a) a Global Positioning System (GPS) satellite;
(b) a land based control station transducer;
(c) a vessel based control station transducer; and
(d) an underwater transmitter anchored to the ocean floor.

4. An aquatic structure according to claim 1 wherein said structure has at least one antenna for receiving communication signals when the antenna projects above the water.

5. An aquatic structure according to claim 1 wherein said structure has at least one underwater transducer for receiving an underwater signal transmission from a transmitter or a transponder placed in a known position underwater.

6. An aquatic structure according to claim 1 wherein said cage has a spherical shape formed by a skeleton assembled together with rigid members and a mesh netting mounted on outer peripheries of the skeleton.

7. An aquatic structure according to claim 1 wherein said cage has a generally spherical shape with a front side and a trailing side for controlled navigation within an ocean current.

8. An aquatic structure according to claim 1 wherein said propulsion system includes at least one thruster unit pivotally mounted on said structure for providing propulsive forces in three dimensions relative to said structure in order to position and maintain said structure in a given geostationary position including at a given depth below the water surface.

9. An aquatic structure according to claim 1 further comprising a central mast.

10. An aquatic structure according to claim 9 wherein the central mast houses the onboard buoyancy control system that is an air buoyancy control system.

11. An aquatic structure according to claim 1 wherein said structure includes an automated feed dispenser system for dispensing feed into the cage volume for feeding fish as the ocean resource therein.

12. An aquatic structure according to claim 1 wherein said structure is powered by an engine generator whose working fluid does not change phase.

13. An aquatic structure according to claim 12 wherein said generator is a hybrid engine that employs cold water inducted from lower ocean depths for creating a thermal gradient with warmer water near the ocean surface to assist in the driving of an engine whose working fluid does not change phase.

14. An aquatic structure according to claim 13 wherein said hybrid engine is heated by a fuel-burning unit using fuel stored onboard to drive the hot side of the Carnot cycle in order to enhance power generation while reducing the depth requirement for inducting the cold water.

15. A fully integrated autonomous submersible aquatic structure for growing a fish comprising:
(a) a cage for growing fish within a cage volume contained therein;
(b) a remote controlled onboard dynamic positioning system capable of maintaining the aquatic structure in an approximate geostationary position below the water surface;
(c) an onboard buoyancy control system coupled to the dynamic positioning system;
(d) an onboard propulsion system internal to said cage structure coupled to the dynamic positioning system configured to propel the aquatic structure within the ocean environment in three dimensions;
wherein the onboard propulsion system is powered by a hybrid generator whose working fluid does not change phase that employs cold water inducted from lower ocean depths for creating a thermal gradient with warmer water near the aquatic surface and that is heated by a fuel-burning unit using fuel stored onboard to drive the hot side of the Carnot cycle in order to enhance power generation while reducing the depth requirement for inducting the cold water; and
wherein said remote controlled onboard dynamic positioning system communicates with the onboard buoyancy control system and the onboard propulsion system to position said structure within the ocean environment and to maintain said structure in an approximate geostationary position at a given depth below the water surface.

16. An aquatic structure according to claim 15, wherein said cold water is output as an effluent from said power generator into the cage volume for flushing the water therein with cleaner deep seawater.

17. An aquatic structure according to claim 15, wherein said cold water output is jetted into the cage volume from a central thruster unit.

18. An aquatic structure according to claim 17, wherein said cold water output jet is used to push feed stored onboard into the cage volume for feeding fish as the ocean resource therein.

19. An aquatic structure according to claim 15, wherein the power output of the hybrid generator is used for producing hydrogen onboard from water.

20. A system for growing fish to be maintained in an approximate geostationary position including relative to the water surface comprising a plurality of fully integrated autonomous submersible aquatic structures each such structure comprising;
(a) a cage for growing fish within a cage volume contained therein;
(b) a remote controlled onboard dynamic positioning system capable of maintaining the structure in an approximate geostationary position at a given depth below the water surface;
(c) an onboard buoyancy control system coupled to the dynamic positioning system; and
(d) an onboard propulsion system internal to the cage structure coupled to the dynamic positioning system configured to propel the aquatic structure within the ocean environment in three dimensions;
wherein said remote controlled onboard dynamic positioning system of each structure of the system communicates with the onboard buoyancy control system and the onboard propulsion system of said same structure to position said structure within the ocean environment in three dimensions and to maintain said structure in an approximate geostationary position at a given depth below the water surface; and
wherein each of said structure of the system has a further communication system for communicating its position relative to the positions of at least one other aquatic structure of said system in order to maintain each such submersible structure in a group pattern relative to the other submersible structures in approximate correspondence with a target geostationary position at a given depth below the water surface.

21. A fully integrated autonomous submersible aquatic structure for growing fish comprising:
(a) a cage for growing fish within a cage volume contained therein;
(b) a remote controlled onboard dynamic positioning system capable of maintaining the aquatic structure in an approximate geostationary position below the water surface;
(c) an onboard buoyancy control system coupled to the dynamic positioning system;
(d) an onboard propulsion system internal to said cage structure coupled to the dynamic positioning system configured to propel the aquatic structure within the ocean environment in three dimensions; and
(e) a means for inducting seawater from lower ocean depths to flush the cage structure with clean, nutrient rich, seawater;
wherein said remote controlled onboard dynamic positioning system communicates with the onboard buoyancy control system and the onboard propulsion system to position said structure within the ocean environment and to maintain said structure in an approximate geostationary position at a given depth below the water surface.

* * * * *